United States Patent
Tsai

[11] Patent Number: 5,290,402
[45] Date of Patent: Mar. 1, 1994

[54] AUTOMATIC COLD/HOT DISTILLED WATER FOUNTAIN

[76] Inventor: Yao K. Tsai, 4F-2, No. 12, Sec. 2, Jun-Shan S. Rd., Taipei, Taiwan

[21] Appl. No.: 58,129

[22] Filed: May 10, 1993

[51] Int. Cl.$^5$ .............................. B01D 3/42
[52] U.S. Cl. .................... 202/181; 137/412; 202/185.3; 202/202; 202/206; 203/1; 203/10; 203/DIG. 16; 239/29
[58] Field of Search ............ 202/181, 185.3, 202, 202/206; 203/1, 10, 2, DIG. 7, DIG. 16, DIG. 18; 239/28, 29, 29.5, 24, 132.3; 137/412, 392

[56] References Cited

U.S. PATENT DOCUMENTS

| | | | |
|---|---|---|---|
| 2,865,182 | 12/1958 | Schultz | 239/29 |
| 3,619,084 | 11/1971 | Gordon | 137/412 |
| 4,597,525 | 7/1986 | Cushman et al. | 239/28 |
| 4,744,808 | 5/1988 | Treu | 137/412 |
| 4,818,344 | 4/1989 | Glucksman | 202/181 |
| 4,915,793 | 4/1990 | Chou | 203/10 |
| 4,943,353 | 7/1990 | Shannon | 202/202 |
| 5,021,128 | 6/1991 | Palmer | 203/1 |
| 5,178,734 | 1/1993 | Palmer | 202/181 |
| 5,217,580 | 6/1993 | Chen | 203/10 |

Primary Examiner—Virginia Manoharan
Attorney, Agent, or Firm—Bacon & Thomas

[57] ABSTRACT

An automatic cold/hot distilled water fountain which automatically performs water boiling, condensing, storing and heating processes to provide purified cold/hot drinking water, mainly composed of a distilling chamber, a condensing mechanism, a water reservoir and a heating box, whereby by the automatic control system designed for the water fountain, the water is controllably supplied into the distilling chamber and distilled therein and the distilled water is then collected and stored in the water reservoir to be directly discharged therefrom as a purified cold drinking water or further heated by the heating box to serve as hot drinking water. By the above arrangement, the amount of the water stored in the water fountain is properly kept within a predetermined range and what is most important is the safety and hygiene in water drinking is insured.

1 Claim, 7 Drawing Sheets

AUTOMATIC COLD/HOT DISTILLED WATER FOUNTAIN

BACKGROUND OF THE INVENTION

The present invention relates to an automatic cold/hot distilled water fountain which is designed with specific structural arrangement and control means to overcome the shortcomings existed in conventional drinking fountains and provide a better and safer manner in which drinking Water is supplied to people.

It is well known that the hygienic problem of drinking water has become one of the major subjects concerning environmental pollution. Many water sources such as several main rivers over the word are contaminated by the waste water and acid rain. Although the water coming from these water sources is always first treated by a water works with repeated sterilization and precipitation be±ore it is transferred to the users, various impurities are often still visibly contained in the water, not to mention the invisible harmful bacteria. Therefore, the water supplied by the water works is not suitable for drunking before further treatment is done.

The following are five kinds of common contaminations that are caused by numerous impurities dissolved in the water even the same has been treated by the water works and shall very possibly threaten the health of people:

1. Chlorine: In the beginning of the twentieth century, chlorine is added into the supplied running water for bactericidal purpose so as to control the spreading diseases of typhus, cholera, etc. However, it is found recently that chlorine will react upon the organic materials contained in the water to produce multiple kinds of carcinogen and the possibility of suffering the cancer respecting the users who drink the chlorinated water is twice that respecting the users who drink the unchlorinated water 2. Nitrate: Most of the nitrate contained in the water results from the excreta of animals. After entering human body, the nitrate tends to convert into certain kinds of chemical compounds in the oral cavity, stomach and bladder. Some of such compounds are possibly carcinogens. Moreover, excessive nitrate in the body is likely to cause suffocation of the new born infant.

3. Lead: The lead water conduits will be corroded after long period of use, making lead element dissolved in the water. The water containing lead element has been proved to be harmful to infant brain and will cause reduction of learning ability of the infant.

4. Bacteria: Most of the bacteria in the water come from the excreta of human being and animals infiltrated into the water sources. Although the running water supplied by the water works is chlorinated or filtered, a part of the bacteria are not affected by the chemicals and will still remain in the water transferred to the users. Most of such bacteria pertain to digestive bacteria.

5. Chemicals: The contamination problem of drinking water caused by chemicals is probably the most complex one among others. These chemicals, for example, arsenic, may result from the waste water, toxic material and garbage discharged from a chemical factory, plating factory or leather manufacturing factory. These chemicals will induce remediless injury to human body. One of the most serious injury is the deformation of fetus.

It is the early water-sterilizing process to boil the water for a certain time to achieve the bactericidal purpose. However, the insoluable impurities will still remain in the boiled water to threaten the health and safety of users. Furthermore, the boilded water is unable to cool down in short time for drinking at once. Therefore, the boiling process is not an ideal water treatment.

The current commercially available cold/hot water fountains provide an improved water-treating process to meet the hygienic requirements. The main principle employed in such water fountain is that the water is first filtered by a filtering means and then passes through a cold and a hot water guiding pipes respectively connected to a cold water faucet and a heating means, whereby the filtered cold water can be discharged from the cold water faucet while the water heated by the heating means can be discharged from a hot water faucet. In the above arrangement, in case the filtering means is not regularly cleaned up or the filtering cartridge thereof is not replaced with a new one after a period of use, the filtering effect will reduce and the filtering means may tend to cultivate the bacteria that will result in even worse affection on the health of the users. Therefore, the conventional cold/hot water fountain which purifies drinking water by simply filtering the water cannot provide a satisfactory water purifying effect.

SUMMARY OF THE INVENTION

It is therefore a primary object of the present invention to provide a cold/hot water fountain which is specifically constructed for purifying drinking Water by means of distilling water. Moreover, the cold/hot water fountain according to the present invention performs the water purifying function in a continuous and automatic manner and provides cold/hot drinking water that is ready for drink.

According to the above object, the present invention includes a distilling chamber, a condensing mechanism, a water reservoir and a heating box, wherein the distilling chamber is provided with a ceramic heater and water level controlling float for automatically supplying water to be heated by means of controlling the water level. The steam produced in the boiling process passes through a condensing tube blown by a cooling fan to condense into water which is poured into the water reservoir. The water reservoir is connected to an external cold water faucet, permitting the water collected therein to be used at any time. The reservoir communicates with the heating box via a non-return tube so that the water level in the heating box is as high as that in the reservoir. An upper float wheel and a lower float wheel are disposed in the reservoir for controlling the activation of the heater in the distilling chamber by electrical signal. A second heater and a thermal sensor are disposed in the heating box, whereby the second heater is activated or shut off depending on the fact that the preset temperature is reached or not during the heating or cooling process. A hot water faucet is connected to the heating box for discharging purified hot water. The steam produced in the heating box during the heating process is collected and fed back into the water reservoir by a connecting tube.

BRIEF DESCRIPTION OF THE DRAWINGS

The detailed structure, features, and other objects of the present invention can be best understood by referring to the following detailed description of the preferred embodiments and the accompanying drawings wherein.

DETAILED DESCRIPTION OF THE PREFERRED EMBODIMENTS

Figure 1:
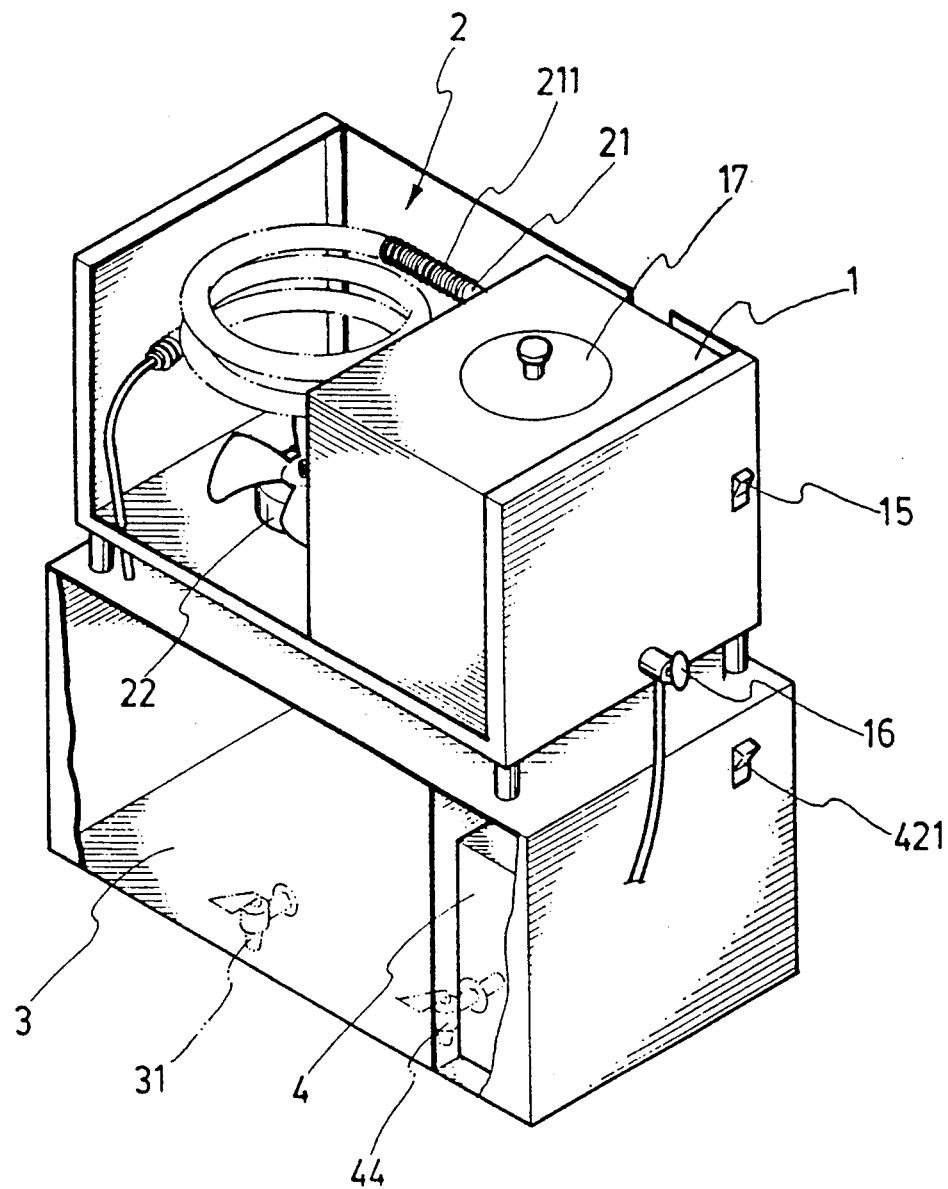
FIG. 1 is a perspective view showing the inner structure of the present invention.
Figure 2:
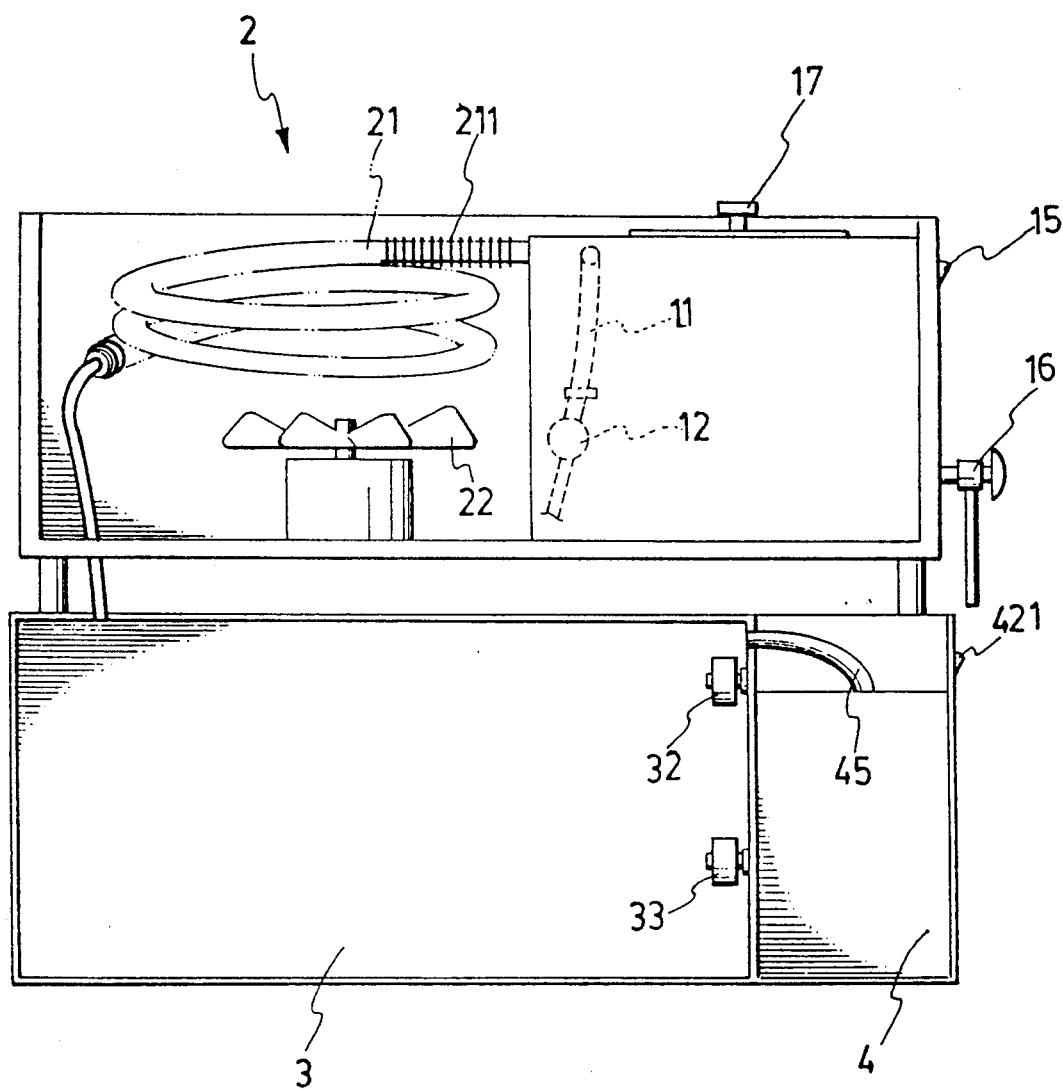
FIG. 2 is a front view according to FIG. 1.

Please refer to FIGS. 1 and 2. The automatic cold/hot water fountain of the present invention is mainly composed of a distilling chamber 1, a condensing mechanism 2, a water reseravoir 3 and a heating box 4, wherein the distilling chamber 1 and the condensing mechanism 2 are disposed on a right and a left sides of an upper portion of the water fountain while the water reservoir 3 and the heating box 4 are disposed on a left and a right sides of a lower portion of the water fountain. The distilling chamber 1, condensing mechanism 2, reservoir 3 and heating box 4 together form a water passage so that the water can be purified and supplied in a continuous and automatic manner.

Figure 3:
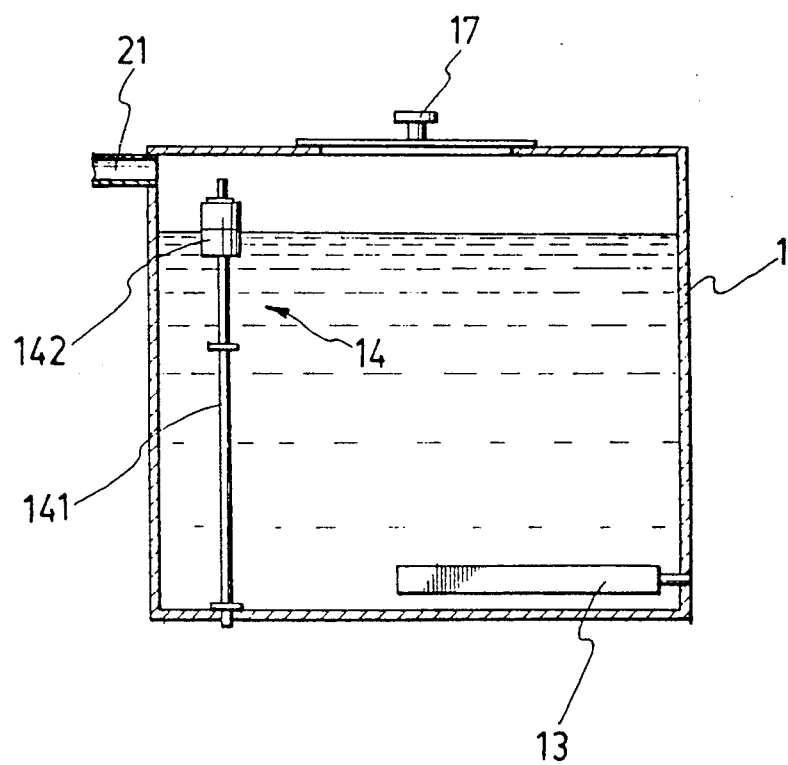
FIG. 3 shows the inner structure of the distilling chamber of the present invention.

Please now refer to FIGS. 2 and 3. The distilling chamber 1 is a close tank provided with a rear water incoming tube 11 which communicates the distilling chamber 1 with an external water source. A solenoid 12 is disposed on the water incoming tube 11 for controlling the water coming therefrom. A first ceramic heater 13 and a water level controlling float 14 are further disposed in the distilling chamber 1. The first heater 13 has the functions of preventing overheating and automatically reducing heating temperture under a low water level condition. The water level contolling float 14 is formed by a post 141 and a limit float 142 mounted thereon, whereby the limit float 142 will ascend or descent with the change of water level. When the water level drops down to a lower limit, an inner magnet of the limit float 142 contacts with a lower limit electrode to produce an electrical signal which activates the solenoid 12, permitting the water to flow into the distilling chamber 1. Reversely, when the water level ascends to an upper limit, the solenoid 12 is shut off to stop supplying the water. In addition, a manually operated switch 15 is further disposed outside the distilling chamber 1 for a user to manually control the activation of the solenoid 12 so that the water supply for the distilling chamber 1 can be manually controlled. A discharging faucet 16 is disposed on an outer side of the distilling chamber 1 and a top cover 17 is disposed on an upper portion thereof for draining and cleaning the distilling chamber 1. As shown in FIG. 2, the condensing mechanism 2 is mainly composed of a condensing tube 21 surrounded by multiple radiators 211, and a cooling fan 22 disposed under the condensing tube 21 for enhancing the cooling effect and speeding the condensing process of the steam. The condensing tube 21 communicates the distilling chamber 1 with the water reservoir 3 and is coiled for increasing the cooling travel of the steam.

Figure 4:
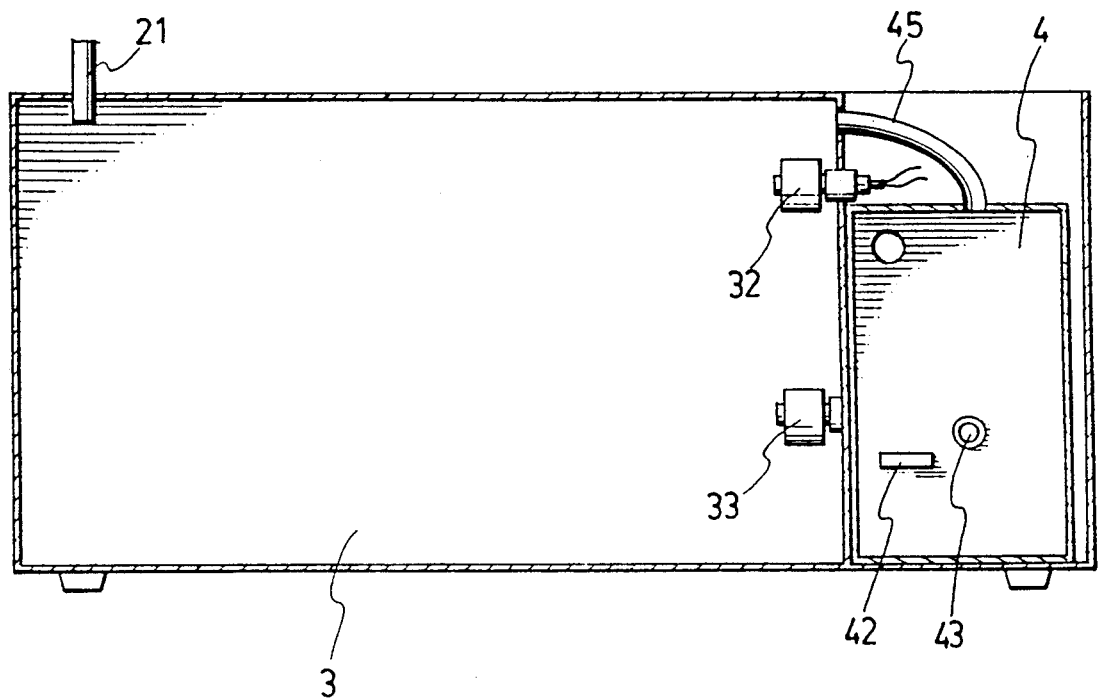
FIG. 4 is a front view showing the water reservoir and heating box thereof.
Figure 5:
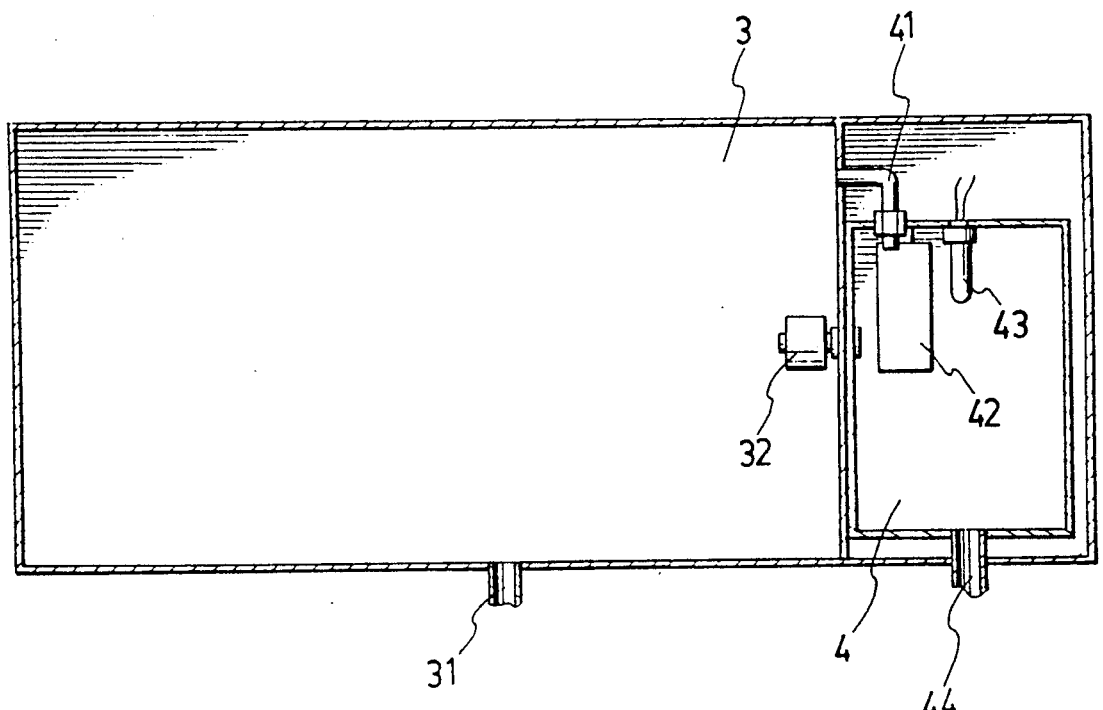
FIG. 5 is a top view according to FIG. 4.
Figure 6:
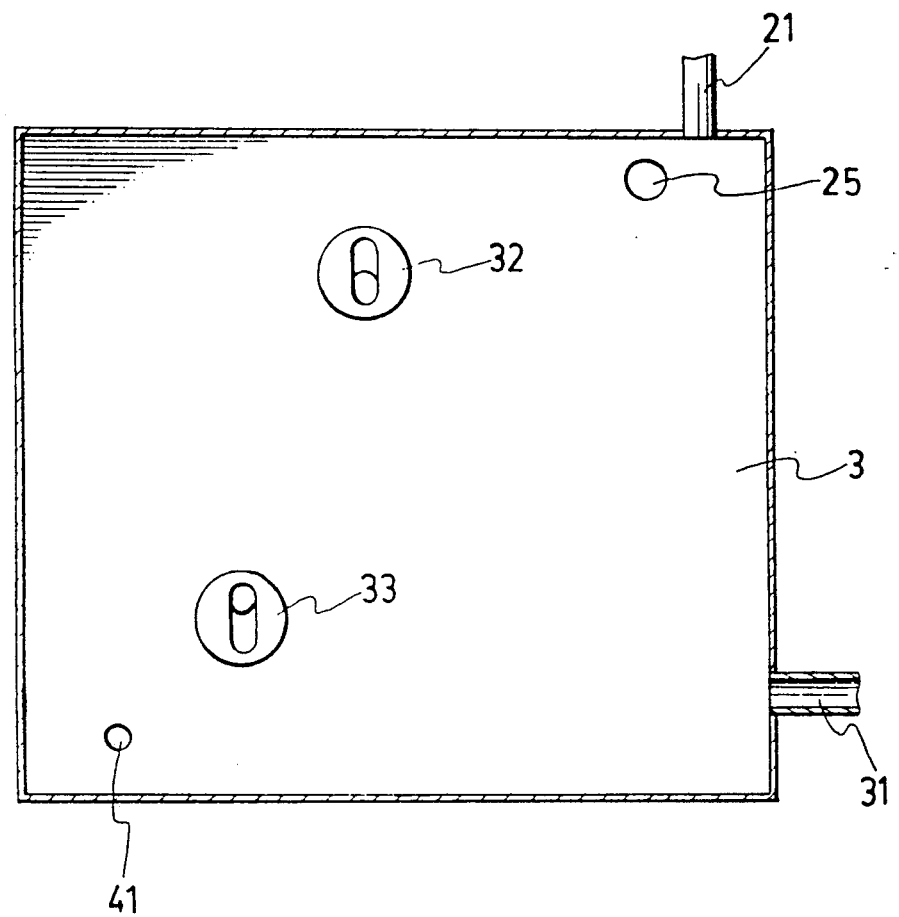
FIG. 6 shows the high and low water level limits in the reservoir.

Please now refer to FIGS. 2, 4 and 5. The water reservoir 3 is communicated with the condensing tube 21 for collecting the distilled water formed by the condensed steam coming from the condensing tube 21. A cold water faucet 31 is mounted on a front side of the reservoir 3 for a user to take drinkable water therefrom. An upper and a lower float wheels 32 and 33 are disposed on a lateral wall of the reservoir 3. Similar to the operation of the aforesaid water level controlling float 14, when the water level drops down to the lower float wheel 33, the first heater 13 in the distilling chamber 1 is activated to heat the water, while when the water level ascends to the upper float wheel 33, the heater 13 is shut off and the heating process is stopped. Therefore, the water level in the reservoir 3 can be properly controlled and the purified water is automatically and circularly produced (as shown in FIG. 6). The heating box 4 is disposed beside the reservoir 3 and is communicated therewith by a non-return tube 41 which is located at a rear bottom portion of the heating box 4, whereby the water in the reservoir 3 can flow through the non-return tube 41 into the heating box 4 while the water in the heating box is prevented from flowing back to the reservoir 3. Due to the atmospherical principle, the water level in the reservoir 3 is always as high as that in the heating box 4. Therefore, when the water level in the reservoir 3 descends, the heating box 4 is simultaneously supplied with water. A second heater 42 and a thermal sensor 43 are disposed in the heating box 4, wherein the heater 42 can be controlled via a manually operated switch 421. Alternatively, the heater 42 can be automatically controlled in such a manner that the thermal sensor 43 detects the temperature of the water in the heating box 4 and produces a signal to control the turning on/off of the heater 42 so as to actually maintain the temperature of the water in the heating box 4 at a preset value. An external hot water faucet 44 is disposed on a front side of the heating box 4 for discharging the hot water therein for the user to drink. Therefore, the present invention can provide both cold and hot water. In addition, a connecting tube 45 is disposed on the heating box 4 for communicating the same with the reservoir 3, whereby the steam produced in the heating box 4 during the heating process can be conducted back into the reservoir 3 through the connecting tube 45.

According to the above arrangement, the distilling chamber 1 of the present invention vaporizes the water into steam and conducts the steam into the condensing mechanism 2 which condenses the steam into water. The condensed water is then conducted into the water reservoir 3 and can be discharged from the cold water faucet 31 as a cold purified drinking water. On the other hand, the cold drinking water in the reservoir 3 can be conducted into a heating box 4 and controllably heated therein and then discharged from the hot drinking water faucet 44 to serve the user. Therefore, the present invention manufactures purified water in an automatical and circular manner so as to insure a safer and hygenic drinking water. Moreover, the present invention is such designed that the cleaning procedures can be conveniently performed.

Figure 7:
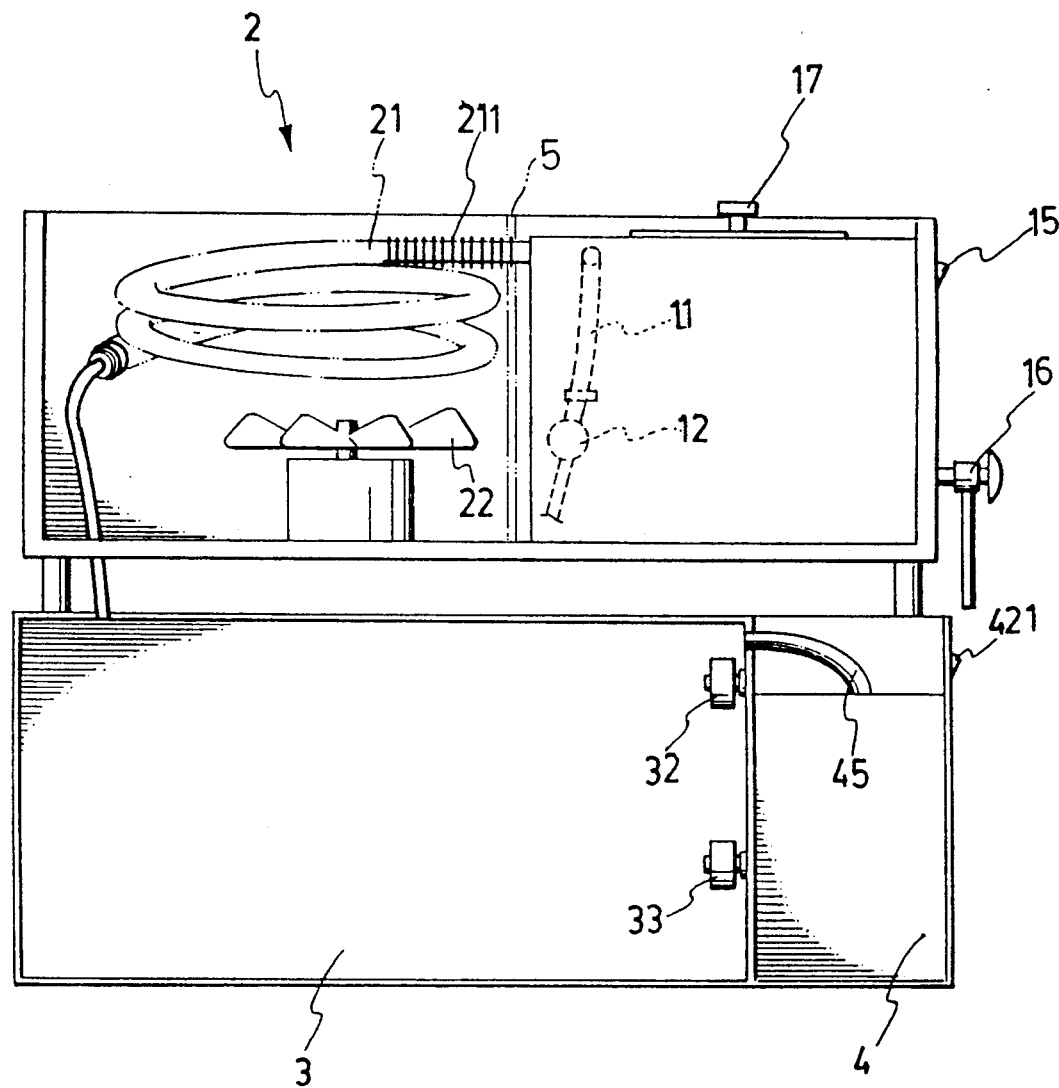
FIG. 7 shows a first embodiment of the partition of the present invention.
Figure 8:
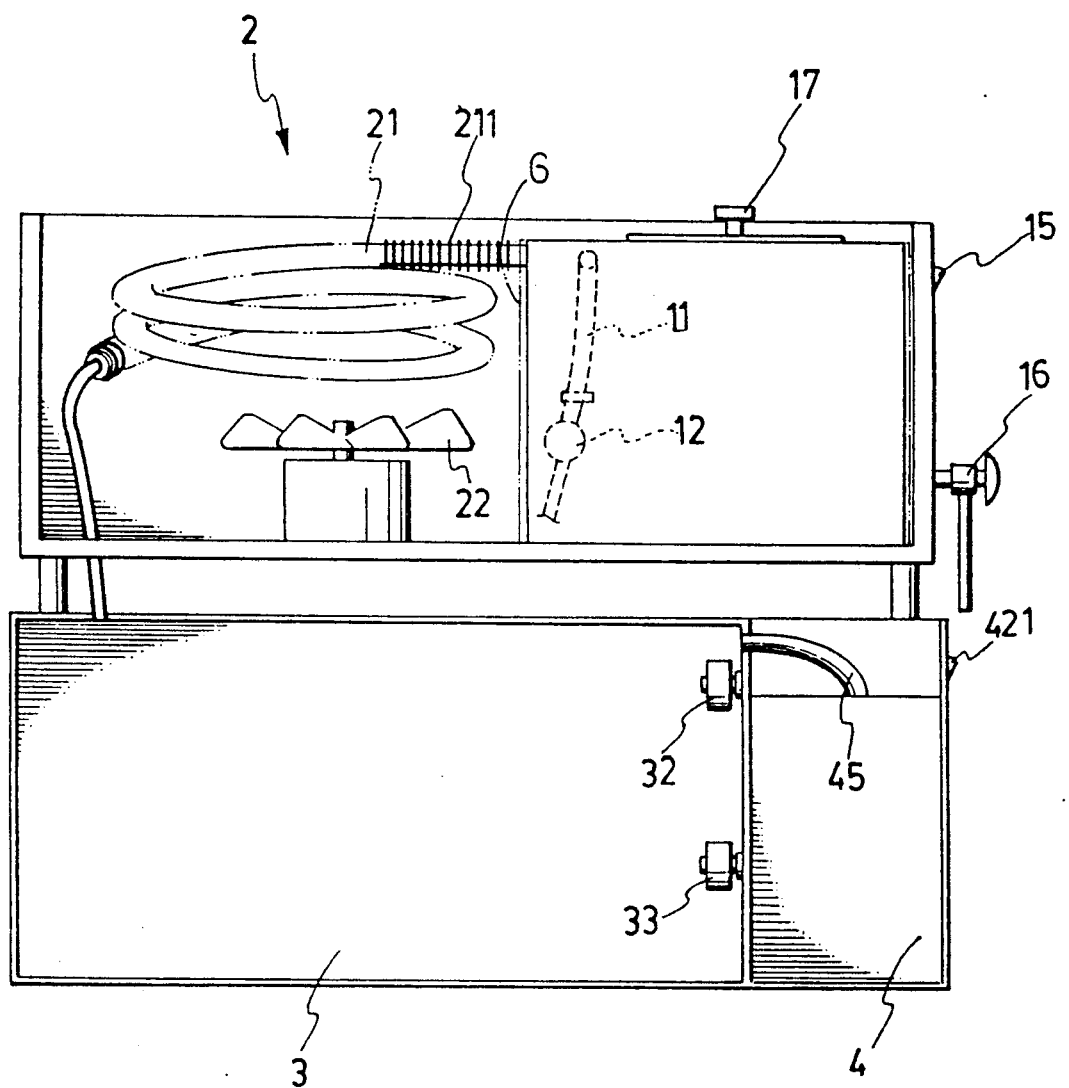
FIG. 8 shows a second embodiment of the insulating layer thereof.

Please refer to FIGS. 7 and 8. To avoid the lose of thermal energy in the distilling chamber 1 due to the operation of the cooling fan 22, which will increase the load on the heater 13, a partition 5 is disposed between the distilling chamber 1 and the condensing mechanism 2 as shown in FIG. 7 so as to isolate the air flow blown from the cooling fan 22 from the distilling chamber 1. Alternatively, as shown in FIG. 8, the distilling chamber 1 can be wrapped with a heat-insulating layer 6 so that the lose of thermal energy in the distilling chamber 1 can be minimized.

The foregoing description exemplifies preferred embodiments of the present invention. Still other variations and rearrangements of component parts are possible without departing from the spirit and scope of this invention and will readily present themselves to one skilled in the art.

What is claimed is:

1. An automatic cold and hot distilled water fountain comprising a distilling chamber, a condensing mechanism, a water reservoir and a heating box;

said distilling chamber including an upper cover and lateral draining switch to facilitate the draining and cleaning of said distilling chamber, a water incoming tube which communicates said distilling chamber with an external water source, a solenoid disposed on the incoming water tube for controlling the water coming therefrom, a manually operated switch disposed said water fountain for manually controlling said incoming water tube. A first ceramic heater and a water level controlling float disposed in said distilling chamber; said water level controlling float being formed by a post and a limit float mounted thereon, whereby said limit float will ascend or descend with the change of water level, so that when the water level drops down to a lower limit, an inner magnet of said limit float contacts with a lower limit electrode to produce an electrical signal which activates said solenoid, and reversely, when the water level ascends to an upper limit, said magnet contacts with an upper limit electrode to shut off said solenoid;

said condensing mechanism including a condensing tube surrounded by multiple radiators, and a cooling fan disposed under said condensing tube for enhancing the cooling effect and speeding the condensing process of steam;

said water reservoir being communicated by said condensing tube with said distilling chamber so as to collect distilled water formed by the condensed steam coming from said condensing tube; a cold water faucet mounted on the front side of the water reservoir for direct serve, an upper and a lower float wheels disposed on a lateral wall of the water reservoir, whereby when the water level of said water reservoir drops down to said lower float wheel, said first heater in said distilling chamber is activated to heat the water flowing into said distilling chamber and when the water level of said water reservoir ascends to said upper float wheel, said first heater in said distilling chamber is shut off to stop the heating process; and said heating box being disposed beside said reservoir and communicated therewith by a non-return tube which is located at a rear bottom portion of said heating box, allowing water in said reservoir to flow only in one direction from said reservoir through said non-return tube into said heating box, and, due to the atmospheric pressure, the Water level in said reservoir can be as high as that in said heating box; a second heater in said heating box and thermal sensor disposed in said heating box, wherein said second heater is controlled via a manually operated switch or automatically controlled in such a manner that said thermal sensor detects the temperature of the water in said heating box and produces a signal to control the turning on and off of said second heater so as to maintain the temperature of the water in said heating box at a preset value, an external hot water faucet disposed on a front side thereof for discharging hot water therein to serve a user, and an additonal connecting tube disposed on a top portion of said heating box for communicating the same with said water reservoir, whereby the steam produced in said heating box during the heating process can be fed back into said water reservoir through said connecting tube.

* * * * *